L. BRANDT.
HOUSE CONSTRUCTION.
APPLICATION FILED MAY 11, 1918.

1,421,124.

Patented June 27, 1922.
8 SHEETS—SHEET 1.

Inventor
Lewis Brandt,

Witness
Chas. L. Griesbauer

By
Attorneys

L. BRANDT.
HOUSE CONSTRUCTION.
APPLICATION FILED MAY 11, 1918.

1,421,124.

Patented June 27, 1922.
8 SHEETS—SHEET 3.

Witness
Chas. L. Griesbauer

Inventor
Lewis Brandt,
By Lyon Cushman &Lea
Attorneys

UNITED STATES PATENT OFFICE.

LEWIS BRANDT, OF PITTSBURGH, PENNSYLVANIA.

HOUSE CONSTRUCTION.

1,421,124.

Specification of Letters Patent. Patented June 27, 1922.

Application filed May 11, 1918. Serial No. 233,960.

*To all whom it may concern:*

Be it known that I, LEWIS BRANDT, a citizen of the United States, residing at Pittsburgh, in the county of Allegheny and State of Pennsylvania, have invented new and useful Improvements in House Construction, of which the following is a specification.

The present invention relates to houses and more particularly to houses of a type adaptable to industrial housing operations, which operations demand the erection of a large number of houses in a minimum time and at a minimum expense, such houses being generally of small type and of simple design and finish.

While the houses constructed in accordance with my invention are, generally speaking, of the portable type, in that they are manufactured from units or panels as to floors, walls, partitions, and roof, so that the difficulties of transportation and assembling are minimized, yet they differ from the so called "ready-cut" type in that, instead of merely cutting the material out and then assembling it piece by piece, standardized panels or units are built which are locked or tied together, so that in the assembled structure a permanency and stability is secured by my improvements which distinguishes the present development from many of the knock-down or portable houses now known to me, and, furthermore, the labor of assembling is greatly reduced.

The invention contemplates, therefore, a construction in which the structural units or panels are completely built at the mill, such units being of a size which will permit them to be easily loaded for transportation and to be easily handled at the point of erection, preferably of such size that the largest unit can be handled by two men. Furthermore, the construction is such that the work of assembling and erecting the units may be done by unskilled labor and in a very short space of time. Finally, by the means herein disclosed, the house when erected is finished both as to inside and outside trim, and the necessity of finishing walls, partitions, or ceilings by independent operations is done away with.

In order that the invention may be clear to those skilled in the art, I have shown in the accompanying drawings one embodiment of the invention, but it will be understood that this disclosure, both illustrative and descriptive, is but one example or adaptation of the invention and in no sense restrictive thereof.

Referring to the drawings by numbers, like numbers indicating like parts in the several views, 10 (Fig. 2) denotes the ground plates or sleepers of the building, which will, of course, be cut to suitable lengths and dimensions and rest upon any suitable supports or foundations, such as piers, walls, or the like. Upon the said plates will be mounted the sills or girders 11 and secured thereto in any suitable manner. Upon this base will be erected the building made in accordance with my invention.

The flooring will be made up of units or panels of substantially uniform size and comprising the framing pieces 12 made up into rectangular frames and having secured thereto the flooring materials 13 which may be of any suitable type. The flooring will be laid with its edges flush with the frame on two sides so as to make a flush joint where the panels come together as shown in Fig. 4 at 14, but will be extended beyond the framing pieces 12 on the other two sides of the panel as shown in Fig. 3 at 15 so as to project beyond and overlie the girders or sills 11 and make a flush joint with the flooring of a succeeding panel. A furring piece 15ª will preferably be provided to overlie the sleeper and abut the edge of the flooring 13 as shown in Figures 2 and 4.

Figures 2, 7:
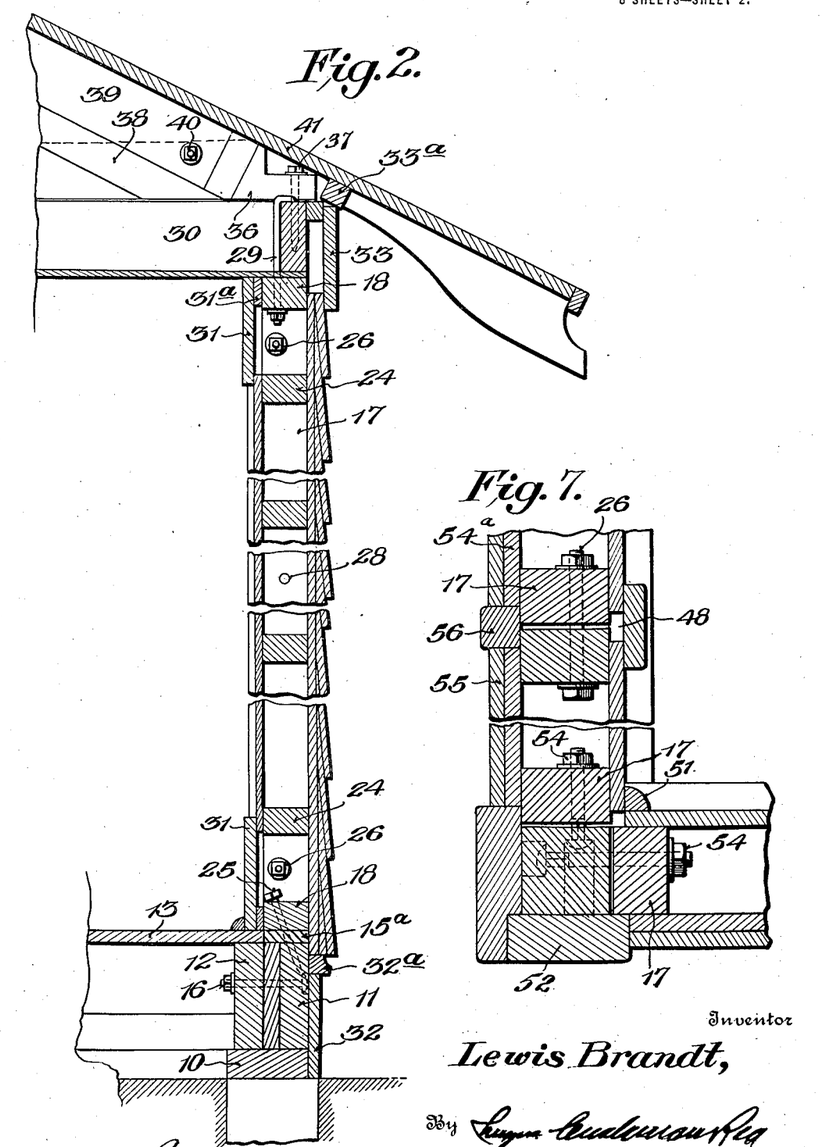
Figure 2 is a view in vertical section of the floor, side wall, ceiling and roof, the side wall being broken horizontally for lack of space.
Figure 7 is a view similar to Fig. 6 showing a slightly different corner construction and illustrating an outer side wall having horizontally arranged sheathing.
Figure 3:
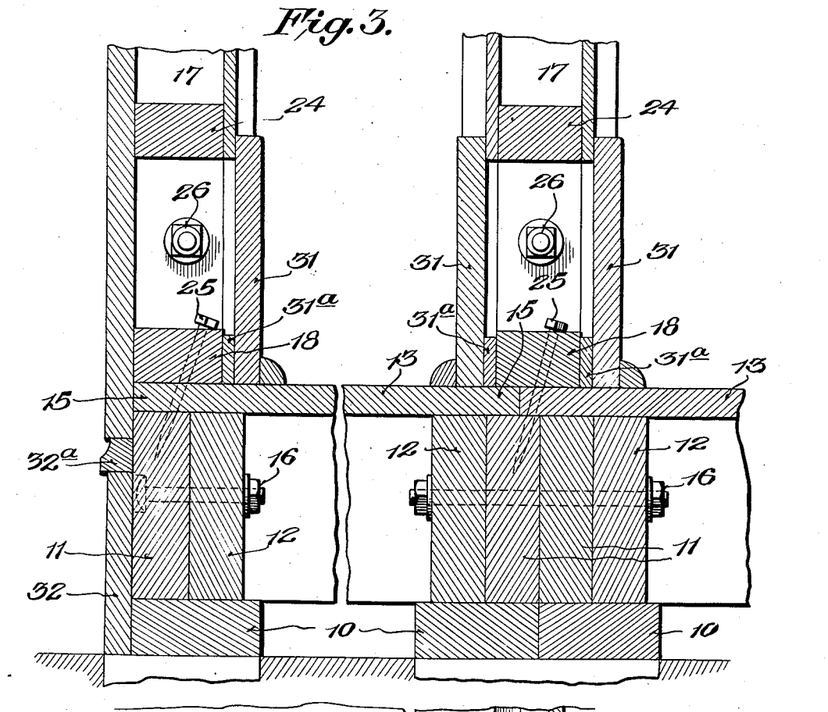
Figure 3 is an enlarged view in vertical section showing the sills or girders, the floor frames, and a portion of a side and a partition wall.
Figure 4:
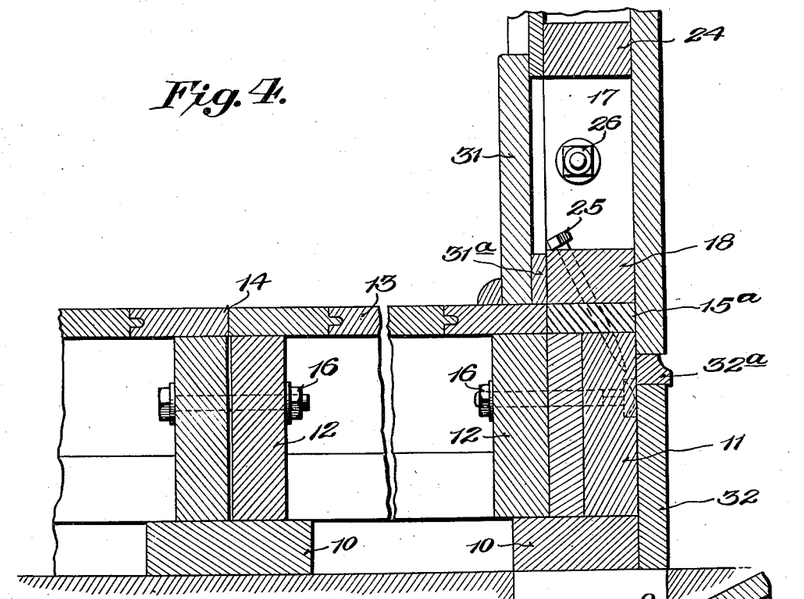
Figure 4 is a view similar to Fig. 3 but taken at right angles to the section in that figure.

These floor panels, constructed as described, are furnished in sufficient number for the area of the foundation to be built upon, and are assembled and secured together by means of bolts 16 by which they are secured both to the sills or girders and to one another as clearly shown in Figs. 2, 3 and 4.

Figure 10:
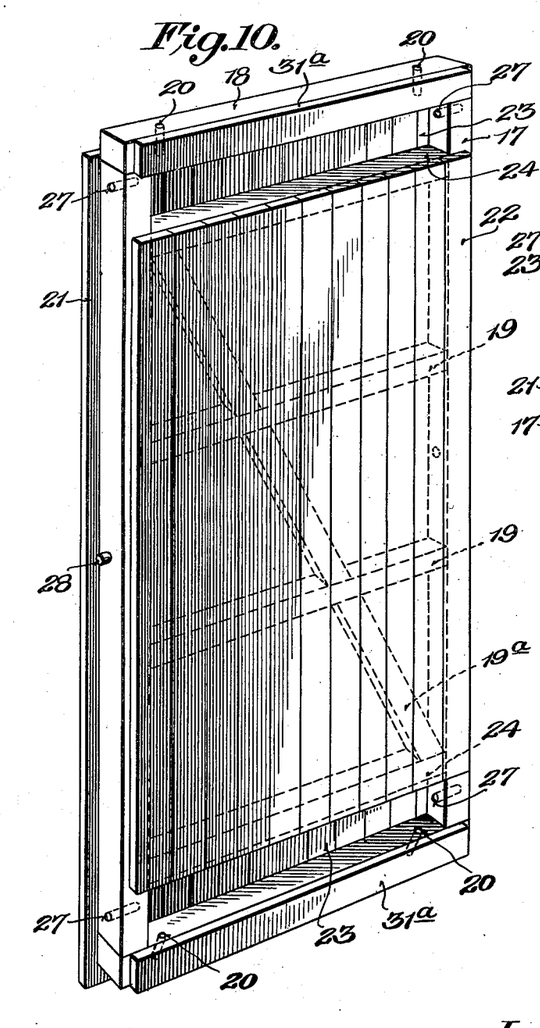
Figure 10 is a perspective view of a unit or panel.
Figure 11:
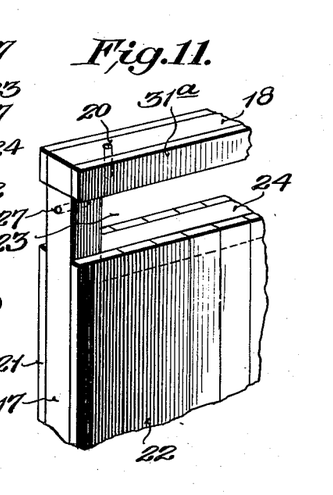
Figure 11 is a perspective view of a portion of a slightly modified type of panel particularly adapted for interior partitions.

Upon the floor structures described will be erected the side and partition walls of the building, and these side and partition walls are made up of units or panels, which, as best shown in Fig. 10, comprise frames made up of vertical framing pieces 17 and end framing pieces 18 secured together in any suitable manner, cross braces 19 being provided if desired, and diagonally disposed braces 19ª, laid between the cross braces to further strengthen the unit, may be inserted. The end pieces 18 of these panels will be provided with bolt holes 20 to receive lag screws or bolts, to fasten them to the floor and secure them to the ceiling hereinafter to be described, and preferably the holes 20 in the lower or base piece of the unit will be inclined as shown, in order that the lag screws may be conveniently driven at an angle from the outside of the partition. The outside trim 21 may be of any suitable type. The inside trim 22 may also be of any suitable type, either tongue and groove, rock-board, or lath and plaster, but will not extend the full length of the panel, so as to leave a working space 23 at each end of the panel, a cross brace 24 being provided to which the ends of the inside trim are secured. This working space, as shown in Fig. 10, is on one side of the panel only and in the case of the side wall units this will preferably be the construction although this working opening might be on the outer side of the panel if desired, or both sides of the panel might be provided with a working space; and as shown in Fig. 3, the partition panels will have the working space accessible from both sides. This working space 23 enables the laborer to have ready access to the interior of the panel for the purpose of inserting the lag screws or bolts 25 by which the panels are secured to the floor and the sleepers, and also to insert and set up the tying bolts 26 by which the adjacent panels are bolted to one another, the side framing pieces 17 being provided with bolt holes 27 to receive the tying bolts, and preferably to center and bring into immediate registry with each other the successive panels, a dowel pin or other projections 28 is provided on the side framing piece 17 to engage a suitable recess or hole in the adjoining frame. The side panels, secured to the floor and to one another as described, will be secured to the ceiling panels by hook bolts 29 (Fig. 2) which pass through bolt holes in the end pieces into the working space at the upper end of the wall panels. After the erection of the side and partition walls in the manner described, the working openings will be closed by base and frieze boards 31 as shown in Fig. 2 thus completing the finishing out of the interior of the building. Preferably furring pieces 31ª will be provided at top and bottom of the units to support the base and frieze boards 31. It will be seen that this finishing out operation involves only the applying of the base and frieze boards over the working openings at the top and bottom of the side walls, and no independent wall-finishing operations are necessary.

It will be observed from Figs. 2, 3 and 4 that the outside sheathing of the panel projects slightly beyond the end framing pieces 18 at the lower end so as to lap the girders at the bottom, and the space at the bottom of the structure will be closed by a mould board 32 which may be secured in various fashions to the plate and side panel. Preferably, however, the base board 32 will be set close under and flush with the sheathing of the side wall unit, and a slightly coved strip 32ª is interposed between said base board and siding to give a sightly joint.

The ceiling is made up of panels or units of the same general rectangular type as the floor panels heretofore described, the said frames 30 being finished on their under side with any suitable or desired ceiling finish and bolted together by the tying bolts 35, the frames 30 which rest upon the side walls being fastened to the upper framing pieces 18 of the side wall panels by hook bolts 29 as heretofore described.

Figures 6, 9:
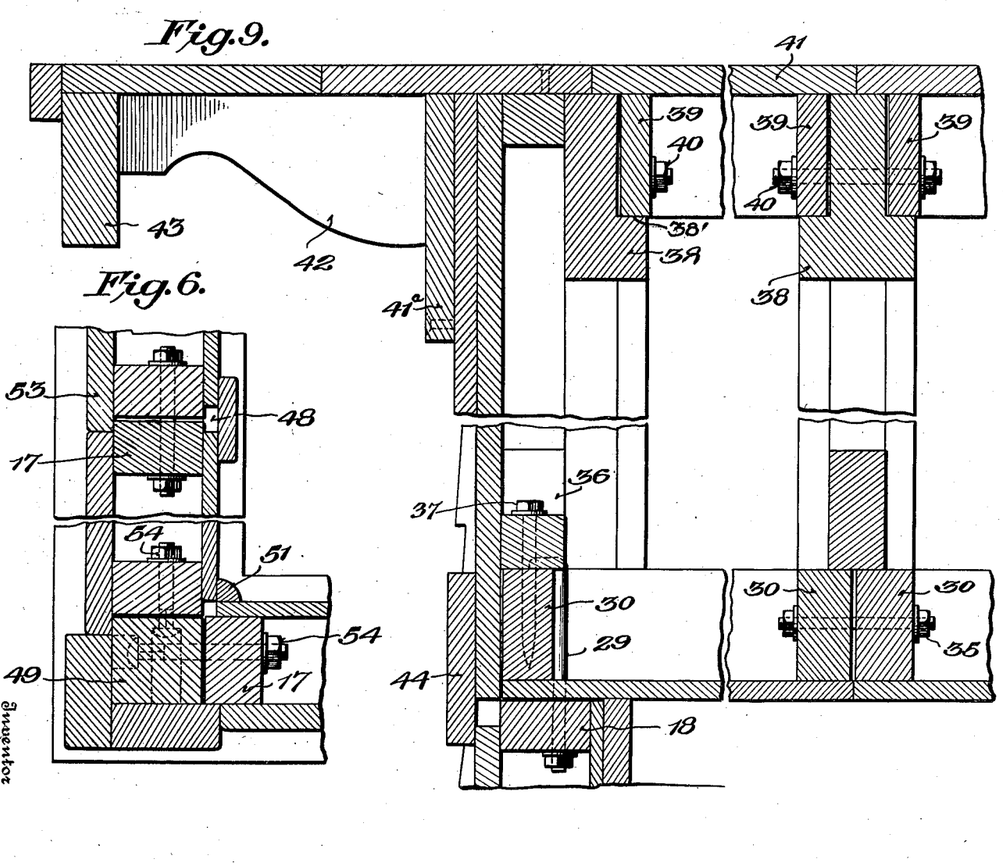
Figure 6 is a view in horizontal section to show the corner construction and illustrates an outer side wall having vertical sheathing.
Figure 9 is a sectional view taken at right angles to the section of Fig. 8 substantially on the line 9—9 of Fig. 8.
Figure 8:
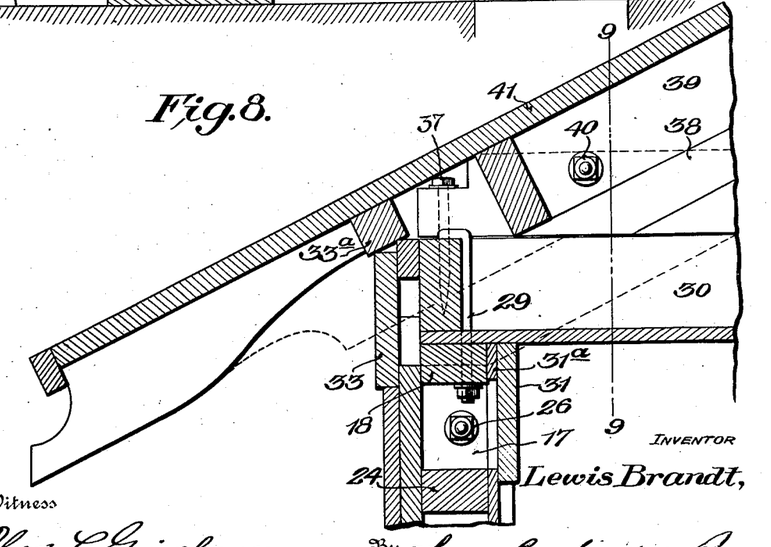
Figure 8 is a vertical section of the roof and side wall to show the manner of assembling.

Truss chords 36 are provided which extend horizontally from wall to wall of the structure, being upheld, of course, by the intermediate partitions and secured by lag screws 37 to the framing pieces of the ceiling panels. To the said truss cords are secured the truss rafters 38 which extend upwardly to the peak of the roof. The said truss rafters 38 are formed with ledges 38', as shown in Fig. 9, upon which ledges are seated the frames 39 of the roof panels or units which are bolted to each other and through the truss chord and truss rafter by means of the tying bolts 40. The roof panels or frames are sheathed with any suitable sheathing material as 41, the edges of which project beyond the framing so as to lap the truss rafter and give a closed joint as shown in Fig. 9. The roof as thus constructed may be finished and sealed with any desired roofing material as tin, roofing fabric, roofing composition, or the like. As shown in Fig. 9 the roof sheathing will extend outwardly beyond the walls at the gable and be provided with a frieze 41ª, a bracket 42, and a verge board 43 to give the desired trim or finish. At the eaves (see Figs. 2 and 8) any suitable eaves bracket may be provided to finish and support the eave extension, which extension rests preferably on a nailing strip 33ª.

Figure 5:
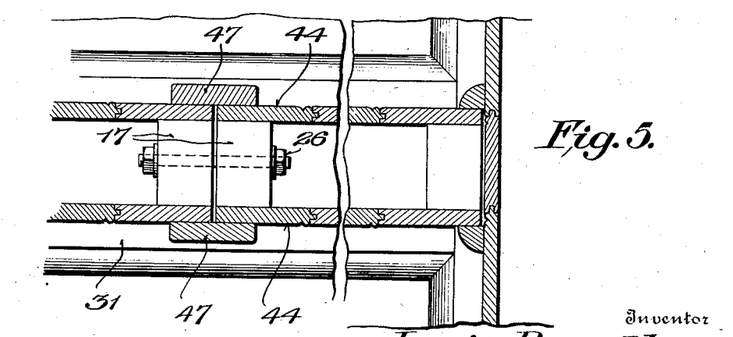
Figure 5 is a view in horizontal section of a partition wall and a side wall with a trim or finish of tongue and groove stuff.

As has been heretofore explained and as shown in Fig. 5, the partition panels will preferably be formed as shown with the finish 44 extending flush to the edges of the frame and preferably the joints between the frames will be covered by sealing strips 47 as shown in Fig. 5.

The side wall panels will be similar in construction with the partition panels except that the sheathing on the inside of the panels will preferably extend not quite to the edge of the panel frame, so as to leave, when the panels are assembled, a slight space or clearance between the edges of the sheathing as shown at 48 Figs. 6, 7 and 10. The purpose of this is to facilitate the making of corners and do away with the necessity of special panels for corner construction. As shown in Figs. 6 and 7, the corners are made by providing a corner post 49 to which the framing pieces 17 of the panels are bolted by means of tying bolts 54. These bolts, as shown, fasten through bolt holes in the corner post, which holes are on line so as to register with the uniformly spaced holes in the panel frames, and in order that there may be no interference between the bolts 54 they are recessed into the corner posts so that when one bolt is seated and set up its head will be clear of the other bolt passage as clearly shown in Figs. 6 and 7. It will be seen that when the panels are brought up to the corner post and bolted, the inside sheathing will give a close corner joint by reason of the fact that it does not extend to the edge of the frame and so does not interfere with the close assemblage of the panels at the corner. The corner may be finished as are the floor angles in any suitable manner, as by the quarter strip 51. On the outside, the corner may be finished as shown in Figs. 6 and 7 by the corner boards 52.

In the outside finish shown in Figs. 2 and 9, a shingle finish is shown, but it is obvious that other trims may be provided and in Fig. 6 a trim of vertical sheathing is used. In this form, the sheathing 53 will be laid, as shown, so as to break joints on the panel frames, the sheathing on one side of the frame extending slightly beyond the edge of the frame while that on the adjacent side of the succeeding frame does not extend quite to the edge so as to give a matched and sealed joint. This result is obtainable by reason of the fact that the outside sheathing, as shown in Fig. 10, is offset relative to the frame, so as to project at the bottom and one side and set back at the top and the other side.

In Fig. 7, a construction is shown in which a horizontal sheathing is used, and in such construction there will preferably be a double sheathing comprising the vertical strips 54ª and the horizontally disposed outer trim 55 which sheathing does not extend quite to the edge of the frame and the clearance between the sheathing and the joint between the frames will be finished by means of the filling strip 56.

Figure 1:
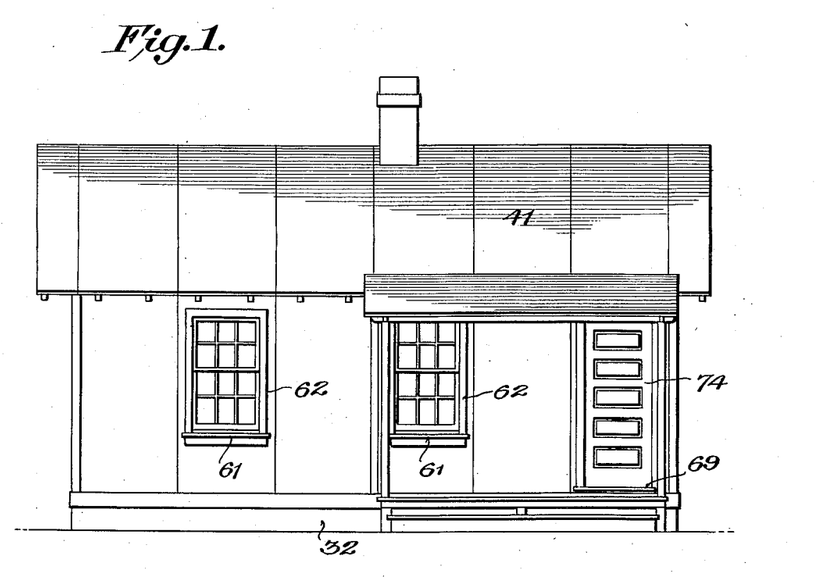
Figure 1 is a view in front elevation of a house built in accordance with the present invention to show the general disposition of the units or panels in the completed house.

From the illustration of a completed house shown in Fig. 1, it will be seen that the units or panels are of uniform size and are, therefore, interchangeable, so that they may be set up and secured together in any number, dependent on the area of the house. Furthermore, the windows and doors will be mill-made in the units and may be installed at any point in the building where it is desired, and a fixed plan for door and window installation need not be followed. This results in great flexibility in building and permits variation in plan to suit different needs.

Figure 12:
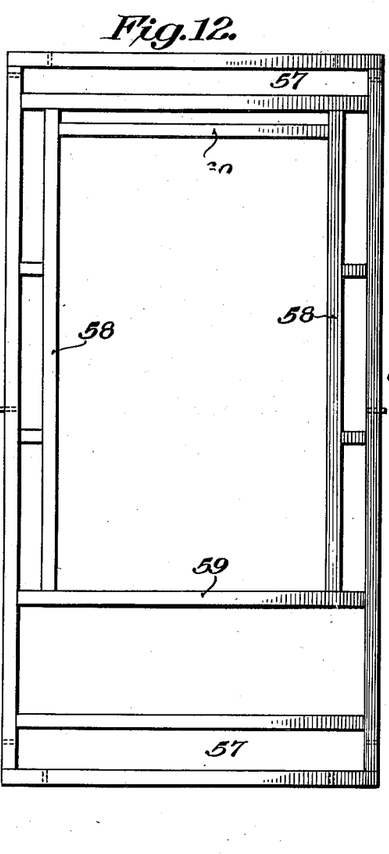
Figure 12 is a view in elevation of a window panel frame.
Figure 13:
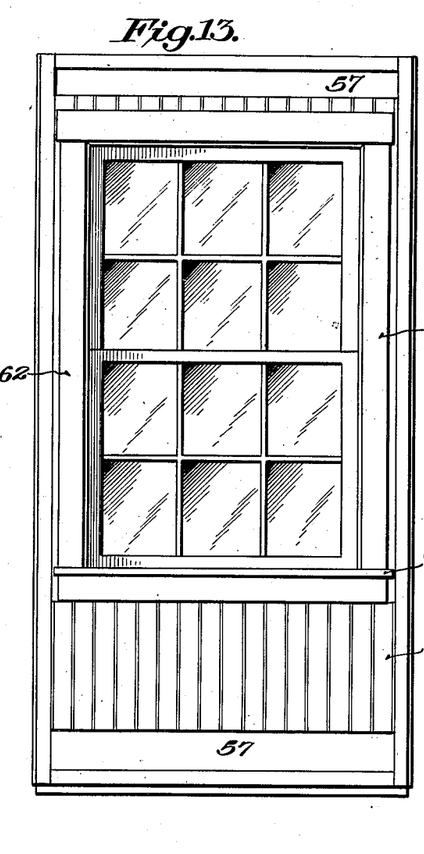
Figure 13 is a view in elevation of a completed panel having installed therein a window.
Figure 14:
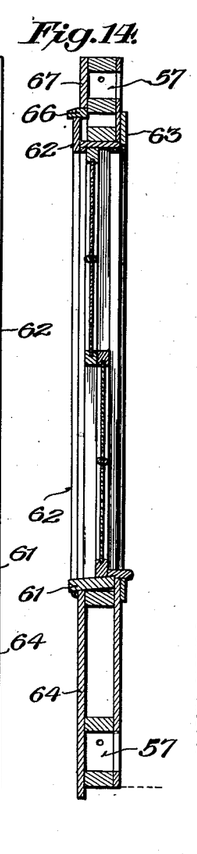
Figure 14 is a vertical section of the window panel shown in Fig. 13.

In Figs. 12, 13 and 14 I have shown a panel having a window built therein. The unit carrying the window will be made of the same size and of the same general construction as the unit heretofore described, having the side pieces and end pieces and the working spaces 57 at top and bottom as shown in Figs. 12 and 13. Within this frame will be disposed the window casing proper which is made up of the side frames 58 blocked from the side frames of the unit as shown, a sill frame 59 being provided, and a top piece 60 to receive the trim being secured between the upper ends of the side pieces 58. The window trim and the sash will be installed in this window casing and the unit will then be finished interiorly and exteriorly in the manner heretofore described in connection with the other unit and as shown in Fig. 13.

Figures 18, 19:
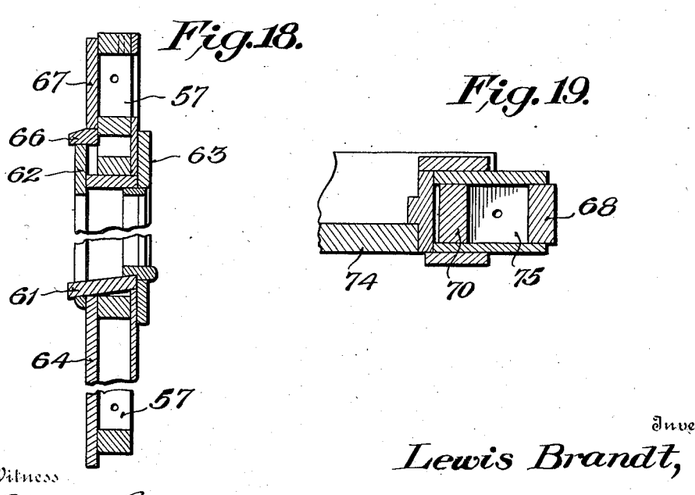
Figure 18 is a view in vertical section on an enlarged scale of the window panel, the view being broken horizontally for compactness of illustration.
Figure 19 is a detail view in horizontal section on substantially the line 19—19, Fig. 16.

As shown in Figs. 14 and 18, the frame and window casing thus constructed will be trimmed out and the sash installed. The trim, as disclosed, comprises the sill piece 61, the side strips 62 and the inside trim 63. The sill piece 61 projects outwardly beyond the frame and is slightly inclined so as to insure water drip, the outside trim 64 coming snugly beneath the sill as shown. The outside trim extends upwardly to a point closely adjacent the working space at the upper end of the window and is capped by a filling strip 66 extending outwardly and beveled or inclined on its upper side to direct the drip outwardly, the frieze 67 covering the working space at the upper end of the frame resting upon this filling strip. By this construction a panel, having already installed therein a window casing and all of the window parts, is provided. It will be understood that similar panels will be constructed for both outer and inner doors, the unit system being preserved throughout; the door unit, as the window unit just described, being provided and built at the mill with the doors, including the hardware and other fittings all installed, so that when the panel is inserted, the door or window, as the case may be, will be ready for use.

Figure 15:
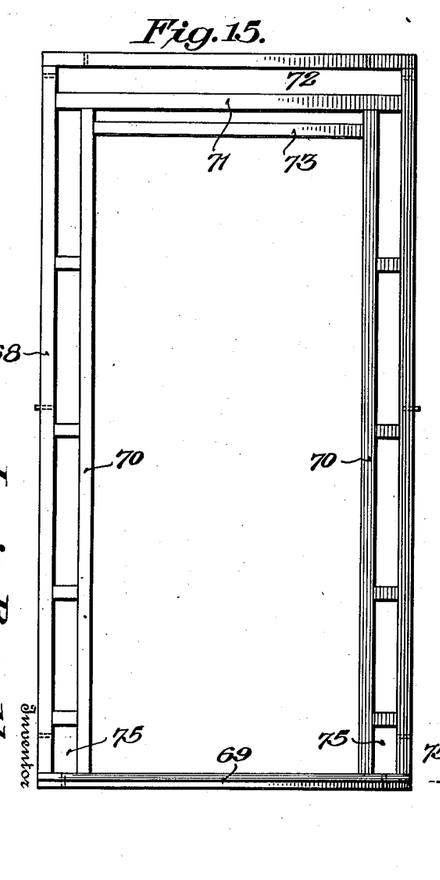
Figure 15 is a view in elevation of a door panel frame.
Figure 16:
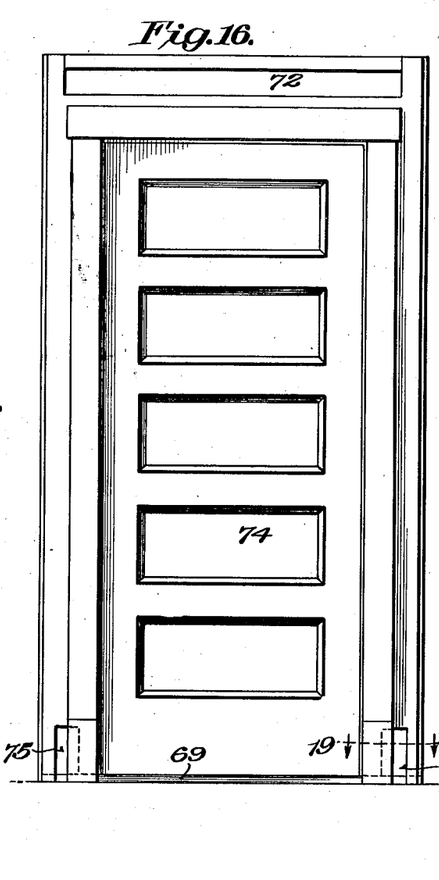
Figure 16 is a view in elevation of a door panel.
Figure 17:
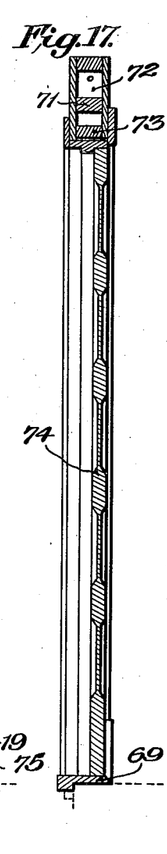
Figure 17 is a view in vertical section of the panel shown in Fig. 16.

In Figs. 15, 16, 17 and 19 I have shown a door panel, which, in general, is similar to the construction heretofore described in connection with the window panel. It comprises the frame 68 made up of side framing pieces and a top framing piece, the lower framing piece 69 being in the form of a sill piece as shown. Within this panel frame is provided the door casing made up of the uprights 70 blocked from the side pieces of the panel frame with their lower ends secured to the sill piece 69 and their upper ends engaging and secured to the cross brace 71 which, together with the top framing piece, forms the working space or pocket 72. A jamb 73 will, preferably, be provided as shown in Fig. 15. To the casing thus described, the door 74 of any suitable design will be hung, this door being provided, of course, with the usual hardware, (not shown) and any suitable casing trim or outside finish may be provided. The trim will be disposed, of course, in the manner heretofore described in connection with all of the panels of this construction, so as to leave the working space 72 at the top for access to the interior, in order that the fastening bolts may be properly installed when the panel is put in place. At the bottom of the door panel there will be provided pockets or working spaces 75 at each side of the door so that the bolts for securing the sections together and the lag screws for fastening the panel to the foundation or floor may be readily installed.

Under the system described complete units or panels of uniform size and mill-made are provided which are convenient of transportation and handling, and which are so designed as to permit their rapid assembling by unskilled labor into a completed house.

Such variations in structure from this disclosure as are within the range of mechanical skill, must, of course, be regarded as within the scope of my invention.

I claim:

1. A finished building panel comprising a rectangular frame, sheathing on both sides of said frame, the sheathing on one side terminating short of the two opposed ends of the frame which constitute in use the bottom and top of the frame, whereby to afford access to the interior of the frame at the bottom and top of the panel, and means in the sides of the frame adjacent the ends permitting the panel to be secured to adjacent panels.

2. A finished building panel comprising a rectangular frame, sheathing on both sides of said frame, the sheathing on one side terminating short of the two opposed ends of the frame which constitute in use the bottom and top of the frame, whereby to afford access to the interior of the frame at the bottom and top of the panel, said sheathing extending longitudinally of the panel, and means in the sides of the frame adjacent the ends permitting the panel to be secured to adjacent panels.

3. A house wall formed of a plurality of interiorly and exteriorly sheathed finished panels, each panel comprising a frame having sheathing on one side terminating short of the bottom of the panel, means connecting the panel frames at points accessible through the working spaces provided by the short sheathing, and base boards covering said working spaces.

4. A house wall formed of a plurality of framed and interiorly and exteriorly sheathed panels the sheathing on at least one side of which is of less extent than the frames to give access at top and bottom to the frame interiors, bolts connecting the panel frames at top and bottom at points accessible through the working spaces provided by the short sheathing, and base and frieze boards covering said working spaces.

5. The combination in a house, of sills, framed and interiorly and exteriorly sheathed wall panels the sheathing on at least one side of which is of less extent than the frame to give access to the frame interiors mounted on said sills, bolts connecting said frames to one another and to said sills at points accessible through the working spaces provided by said short sheathing, ceiling panels, bolts connecting said wall and ceiling panels to one another through said working spaces, and base and frieze boards at the bottom and top of said wall panels to close said working spaces.

6. The combination in a house, of sills, framed and finished floor panels bolted to said sills, framed and interiorly and exteriorly sheathed wall panels the sheathing on at least one side of which is of less extent than the frames to give access to the frame interiors mounted on said sills, bolts tying said frames to one another and to said sills at points accessible through the working spaces provided by said short sheathing, framed and finished ceiling panels, roof truss-chords, bolts tying said wall and ceiling panels and said truss-chords together at points accessible through the working spaces provided by said sheathing, and base and frieze boards at bottom and top of said wall panels to close said working spaces.

7. A house construction comprising framed and finished floor, wall, and ceiling panels, said wall panels having interior and exterior sheathing the sheathing on at least one side being of less extent than the frame to permit access to the frame interior; bolts tying said frames together at points accessible through the working spaces formed by said short sheathing, and base and frieze boards at the bottom and top of said wall panels to close said working spaces.

In testimony whereof I have hereunto set my hand.

LEWIS BRANDT.